Patented July 4, 1933

1,916,770

UNITED STATES PATENT OFFICE

HEINRICH REITZ, OF BITTERFELD, AND HANS EHLERS, OF SANDERSDORF, GERMANY, ASSIGNORS, BY MESNE ASSIGNMENTS, TO PEN-CHLOR, INCORPORATED, OF PHILADELPHIA, PENNSYLVANIA, A CORPORATION OF DELAWARE

METHOD OF IMPROVING THE HANDLING AND STORING QUALITIES OF COMPOUNDS OF CALCIUM

No Drawing. Application filed September 10, 1930, Serial No. 481,080, and in Germany September 17, 1929.

The present invention relates to a method of improving the handling and storing qualities of certain compounds of calcium obtained by crystallization from lyes containing chloride of calcium and is more especially concerned with a method of removing the small quantities of calcium chloride lye still superficially adhering to the crystals after the latter have been separated from the mother liquor by filtration or similar means. The presence even of small quantities of calcium chloride on such crystals is generally disadvantageous or, to say the least, undesirable because of the hygroscopic properties of calcium chloride which result in impairing the handling and storing qualities also of the crystallized product.

Acording to the present invention these small quantities of calcium chloride lye are rendered harmless by intimately admixing with the grains of the separated moist crystals a certain quantity of a preferably finely pulverized alkali salt of any acid which forms an insoluble calcium salt. When the alkali salt is employed in a quantity approximately corresponding to the amount required for converting all the calcium chloride contained in the adhering lye (this easily being found by analysis of the moist product) into the water-insoluble calcium compound, any effect of the alkali salt upon the base crystals can be easily avoided.

The present method is applicable in all cases where it is more essential to obtain a product which is entirely non-hygroscopic than a product which is totally soluble without residue.

Example

Crystals of calcium hypochlorite produced by the known process of chlorinating hydrate of lime in the presence of water, and separated from the main portion of the mother liquor of calcium chloride by filtration under pressure are intimately mixed with finely divided anhydrous sodium sulfate in an amount stoichiometrically corresponding to the quantity of calcium chloride contained in the mother liquor still adhering to the crystals. The calcium chloride lye reacts almost immediately with the sulfate while forming insoluble sulfate of lime and sodium chloride, whose hygroscopic properties are negligible. Owing to the rapidity of the reaction the calcium hypochlorite crystals remain practically unattacked. The inconsiderable amount of water constituting part of the formerly adhering calcium chloride lye is then easily and rapidly removed by heating the salt mixture without any particular precautionary measures.

The dried product contains from about 5 to 10 percent of calcium sulfate, the remainder being calcium hypochlorite, and is practically non-hygroscopic.

Instead of anhydrous sodium sulfate, also anhydrous carbonate of soda or any other alkali salt may be employed as long as the corresponding calcium salt is water-insoluble.

We claim:

1. The method of improving the handling and storing qualities of crystallized calcium hypochlorite obtained from lyes containing calcium chloride which consists in admixing to the finely grained crystals a quantity of sodium sulfate approximately in the proportion stoichiometrically corresponding to the quantity of calcium chloride contained in the adhering lye, and drying the product.

2. A new non-hygroscopic composition consisting of calcium hypochlorite and, in intimate admixture therewith, a quantity of calcium sulfate ranging between approximately 5 and 10 percent of the total.

In testimony whereof, we affix our signatures.

HEINRICH REITZ.
HANS EHLERS.